INVENTORS.
GORDON J. VOELZ
KARL W. MAIER
CHARLES F. TURNER

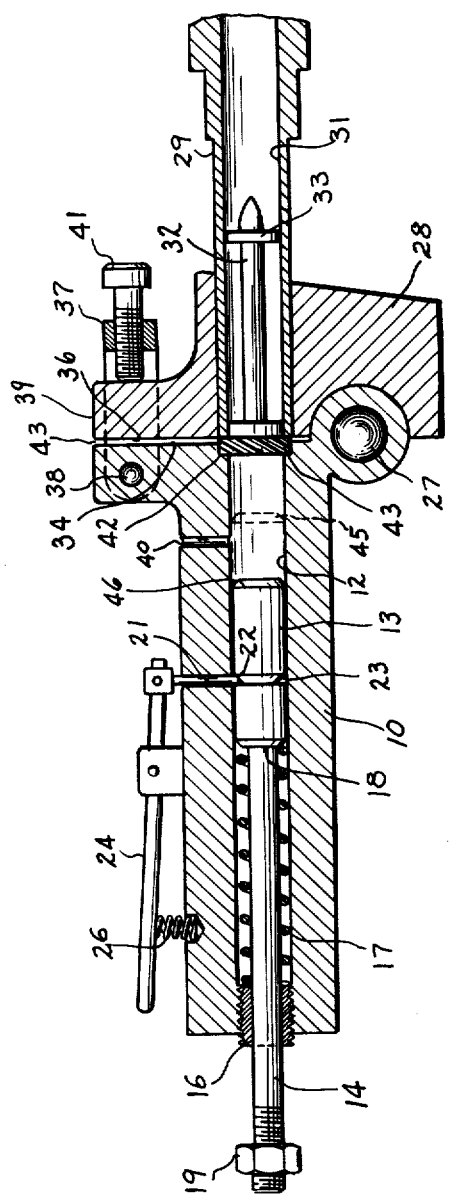
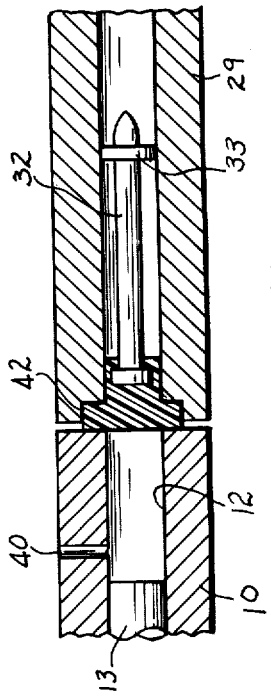
INVENTORS.
GORDON J. VOELZ
KARL W. MAIER
CHARLES F. TURNER

United States Patent Office 3,036,307
Patented May 29, 1962

3,036,307
SEAL FOR POWER TOOL
Gordon J. Voelz, New Haven, Karl W. Maier, Cheshire, and Charles F. Turner, Hamden, Conn., assignors to Olin Mathieson Chemical Corporation, a corporation of Virginia
Filed Feb. 25, 1960, Ser. No. 10,951
2 Claims. (Cl. 1—44.5)

The present invention relates to power devices operative to drive projectiles, such as fasteners, utilizing energy developed by the ignition of liquid propellants.

In particular, the invention relates to a seal means positioned between a propellant cavity or a propellant compression chamber and an adjoining barrel through which the projectiles are driven.

The utility of the present invention is most readily explained by way of discussing the problems which the invention solves.

In utilizing the liquid propellant as a source of power, one is in need of liquid seals in the propellant cavity. In situations where the propellant is ignited by adiabatic compression the seal problem is more acute. The task of sealing is further confounded where, as in the disclosed embodiment of the invention, one is desirous of utilizing the energy developed upon ignition to drive a fastener through a barrel or bore into a workpiece.

To provide access to the barrel for the purpose of inserting the fastener, the barrel is usually separable or at least movable relative to the propellant cavity. Thus, the propellant cavity must have a liquid seal effective to preclude loss of liquid to the atmosphere along a path leading down the barrel and along a path leading across the abutting interfaces of the cavity housing and the barrel wall. After ignition, the seal across the interfaces must be retained; in addition, it is desirable to effect a gas seal in the barrel behind the fastener to insure uniform power in driving the fastener.

A special feature of the present invention is that upon ignition the seal means is partially broken and a new seal is established.

In particular, the seal across the interfaces is retained while the seal to the barrel is broken. This occurrence is operative to establish a third seal; namely, a gas seal behind the fastener.

The gas seal is effected when a portion of the seal means blows out upon ignition and proceeds down the barrel with the fastener. The blown out portion of the seal means operates to prevent hot gases from leaking past the fastener.

It is apparent, then, that the seal means of the present invention is operative to provide three distinct sealing functions for fluid materials; namely, (1) a liquid seal to the barrel, (2) a liquid seal across the abutting interfaces of the propellant cavity and the barrel, and, (3) a gas seal along the barrel retaining hot gases that are driving the fastener.

A power device embracing certain features of the present invention may comprise a compression chamber, an abutting barrel operative to receive and guide a fastener, a piston disposed in the compression chamber and seal means disposed between the cylinder and the barrel operative to seal the cylinder so that the piston and the seal means cooperate to define a generally closed power cavity, said seal means being operative to rupture upon ignition of the propellant so that a portion of the seal means proceeds through the barrel simultaneously with the fastener in response to the energy developed by said ignition being available to form a gas seal behind the fastener.

A method of sealing a combustion chamber or a compression chamber from a barrel in the above class of power devices may embrace the following steps: Disposing a projectile in the barrel, placing a rupturable disc between the chamber and the barrel to seal the chamber from the barrel, positioning the disc so that a portion thereof overlays said projectile, compressing the propellant against the disc, igniting the propellant effective to generate hot gases operative to rupture the disc and to drive the projectile, a portion of said disc proceeding through the barrel in company with the projectile, said portion being further effective to maintain a gas seal in the barrel behind the projectile.

Other features and advantages of the present invention will become more apparent from the succeeding specification when read in conjunction with the appended drawings in which:

FIG. 1 is an elevational view constituting a vertical section through a tool with which the principles of the present invention may be associated;

Figure 2:
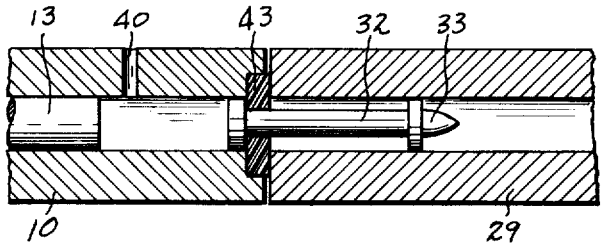
FIGS. 2, 3 and 4 show, schematically, several configurations and dispositions of a seal means relative to the barrel, the propellant cavity and a fastener.

Referring now in detail to the drawings and in particular to FIG. 1, there is disclosed a power tool which utilizes the seal means of the present invention comprising a housing 10 having a longitudinal bore or cavity 12 in which a compression piston 13 is disposed.

The piston 13 carries a cocking rod 14 supported by a guide plug 16 in threaded engagement with a housing 10. A coil spring 17 surrounds the cocking rod 14 and the spring abuts the guide plug 16 at one end and the rear face 18 of the piston at the other end.

By manually grasping the lug 19, the piston is movable to the left against the spring 17 to a cocked position wherein a sear element 21 having a beveled nose 22 is operative to engage an annular notch 23 formed in the piston.

The sear is articulated to an operating rod 24 and is held in the cocked position by the obvious action of a coil spring 26.

Actuation of the operating rod 24 in a direction which tends to compress the spring 26 will release the piston and the piston is then responsive to the coil spring 17 and moves to the right.

Hinged to the housing 10 by means of a hinge pin 27 is a barrel socket 28 carrying a barrel 29. The barrel is formed with a bore 31 and is operative to receive a fastener 32 shown fitted at its forward or right end as viewed in FIG. 1 with a spacer 33. The spacer is effective to center a fastener within the bore 31 and guide it as it is driven from the barrel.

Note that the end walls of the housing 10 and the barrel 29, hereinafter referred to as interfaces 34 and 36 respectively, are operative to face one another as shown in FIG. 1 and may be clamped in this position wherein a U-shaped dog 37 pivoted to the housing 10 by means of a pin 38 is operative to drop over and engage a mating lug 39 formed integral with the barrel housing 28. A set screw 41 is operative in well known fashion to bring the interfaces 34 and 36 firmly toward one another.

The housing 10 is formed with a counterbore 42 in which there is disposed a seal means 43. The seal means 43 may comprise a molded washer or disc of deformable or plastic material, such as polyethylene or metal, which, as will be more apparent hereinafter, can be independent of the fastener 32 (FIGS. 3, 4 and 5), molded integrally therewith (FIG. 7), or carried by the fastener in the fashion of a washer (FIG. 2).

Note further that the interfaces 34 and 36 are spaced apart to insure abutment between the housing 10 and the barrel 29 with the seal means sandwiched between the housing and the barrel.

FIG. 2 discloses the seal means in the form of a washer in which the fastener is received.

Figure 3:
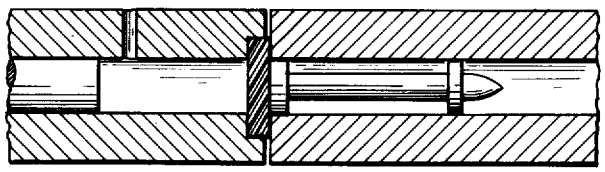

FIG. 3 is a partial section of the disclosure of FIG. 1 showing the seal means in the form of a disc recessed in a counterbore formed in the housing 10.

Figure 4:
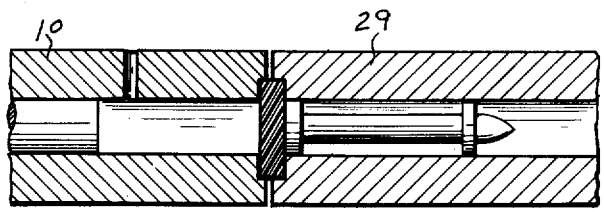

FIG. 4 shows the seal means received in a counterbore formed in the barrel 29.

Figure 5:
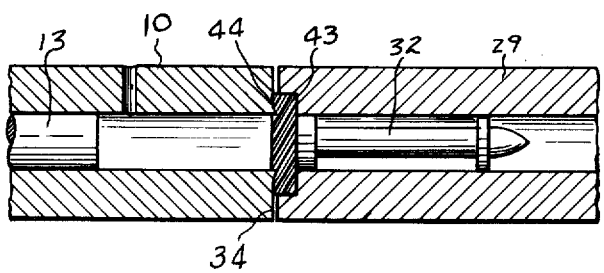
FIG. 5 shows a seal means disposed in a counterbore provided in the barrel portion of the device and further discloses a sealing ring formed integral with the propellant cavity housing.

FIG. 5 discloses a circular sealing ring 44 formed on the interface 34 of the housing 10. This circular ring is especially useful in that it operates over a wide range of seal means thickness. Obviously, the ring 44 may be formed on the housing or barrel, as desired.

Figure 6:
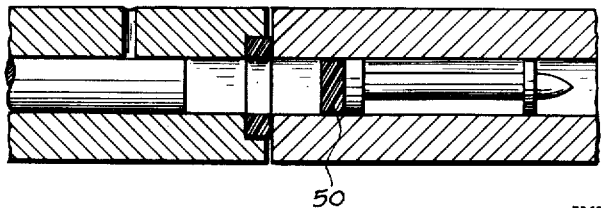
FIG. 6 is a schematic representation of a ruptured seal means at an instant subsequent to ignition, and, FIG. 7 shows a seal means formed integrally with a fastener.

FIG. 6 shows the seal means in ruptured condition with a portion of the seal proceeding down the barrel along with the fastener.

FIG. 7 discloses a seal means molded integrally with a fastener.

The device of FIG. 1 operates in the following fashion:

Upon introduction of a liquid propellant through the aperture 40 into the cavity 12 defined on one end by the face 46 of the piston and on the other by the seal means 43, the lever 24 is actuated to release the piston whereupon the piston 13 moves to the right to compress the propellant.

In the present embodiment, the piston is machined to a fluid tight seal with the cylinder bore, and the piston moves rapidly past the aperture 40 so that little, if any, propellant is lost through leakage past the piston or through discharge from the aperture 40. However, when the piston 13 reaches a position beyond the aperture 40, as shown by the dotted line labelled 45, pressures of the order of 5-to-15,000 p.s.i. are developed and the seal means is effective to prevent leakage of the propellant down the barrel 29 (to the right as viewed in FIG. 1) and across the interfaces 34 and 36 into the undercut region 35.

After the propellant is ignited, hot gases developing pressures in excess of 25,000 p.s.i. are generated whereupon seal means 43 is ruptured and a portion thereof, indicated by the reference numeral 50 in FIG. 6, separates from the main body of the seal means and proceeds down the barrel with the fastener being propelled by the energy generated by the burning propellant.

Note that after the occurrence of ignition and during the interval thereafter, the seal across the interfaces 34 and 36 remains intact while the seal into the barrel at the junction of the interfaces is broken by the rupturing of the seal means.

Note further that a new seal is established by the portion 50 of the seal means which is carried away from the main body of the seal means. The ruptured portion 50 functions to prevent the escape of hot gases past the fastener and operates to insure a uniform thrust upon the fastener as it proceeds down the barrel.

It is anticipated that a wide arrangement of power tools may be devised utilizing liquid propellants which are both adiabatically and electrically fired and which are adaptable to the sealing means of the present invention to effect the three distinct sealing functions described without departing from the spirit and scope of the invention.

What is claimed is:

1. In a power tool of the type powered by liquid propellants operable to drive a projectile, such as a fastener, the improvement comprising a housing having a compression chamber and formed with an interface, a barrel having a bore operative to receive and guide a projectile, said barrel having an interface and being separable from said housing, means for locking the barrel relative to the housing so that said interfaces oppose one another to provide a continuous passage from the housing through the bore, compressible plastic seal means disposed between the housing and the barrel and between said interfaces operable to provide a first seal between the compression chamber and the bore, a second seal between the compression chamber and said interfaces and a third seal between the barrel and the atmosphere.

2. The tool of claim 1 wherein the plastic seal means comprises a slug of plastic molded integrally with a projectile.

References Cited in the file of this patent

UNITED STATES PATENTS

| 2,722,004 | Webber et al. | Nov. 1, 1955 |
| 2,872,846 | Crozier | Feb. 10, 1959 |
| 2,945,236 | Kopf et al. | July 19, 1960 |
| 2,947,221 | Griffin et al. | Aug. 2, 1960 |

FOREIGN PATENTS

| 264,388 | Switzerland | Jan. 3, 1950 |
| 776,372 | Great Britain | June 5, 1957 |
| 1,181,585 | France | Jan. 12, 1959 |